United States Patent
Im et al.

(10) Patent No.: US 12,322,816 B2
(45) Date of Patent: Jun. 3, 2025

(54) BATTERY MODULE, BATTERY RACK COMPRISING SAME BATTERY MODULE, AND POWER STORAGE DEVICE

(71) Applicant: LG ENERGY SOLUTION, LTD., Seoul (KR)

(72) Inventors: Young-Bin Im, Daejeon (KR); In-Jae Gang, Daejeon (KR); Jong-Kyu Ahn, Daejeon (KR); Kyung-Hyun Bae, Daejeon (KR); Jin-Kyu Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 569 days.

(21) Appl. No.: 17/624,945

(22) PCT Filed: Jan. 19, 2021

(86) PCT No.: PCT/KR2021/000764
§ 371 (c)(1),
(2) Date: Jan. 5, 2022

(87) PCT Pub. No.: WO2021/150006
PCT Pub. Date: Jul. 29, 2021

(65) Prior Publication Data
US 2022/0263171 A1  Aug. 18, 2022

(30) Foreign Application Priority Data

Jan. 22, 2020  (KR) .................. 10-2020-0008780

(51) Int. Cl.
*H01M 50/209*  (2021.01)
*H01M 10/04*  (2006.01)
*H01M 50/293*  (2021.01)

(52) U.S. Cl.
CPC ..... *H01M 50/209* (2021.01); *H01M 10/0481* (2013.01); *H01M 50/293* (2021.01)

(58) Field of Classification Search
CPC ............ H01M 50/209; H01M 50/207; H01M 50/213; H01M 50/22; H01M 50/227;
(Continued)

(56) References Cited

U.S. PATENT DOCUMENTS

| 2013/0022857 A1 | 1/2013 | Meintschel et al. |
| 2014/0349164 A1 | 11/2014 | Park et al. |

(Continued)

FOREIGN PATENT DOCUMENTS

| CN | 206250254 U | 6/2017 |
| CN | 208674236 U | 3/2019 |

(Continued)

OTHER PUBLICATIONS

International Search Report (PCT/ISA/210) issued in PCT/KR2021/000764, dated Apr. 29, 2021.
(Continued)

*Primary Examiner* — Raymond Alejandro
(74) *Attorney, Agent, or Firm* — Birch, Stewart, Kolasch & Birch, LLP (57) ABSTRACT

A battery module includes a battery cell assembly having a plurality of battery cells stacked on each other, a pair of end plates provided at both front and rear sides of the battery cell assembly, a pair of buffer plates provided to the pair of end plates and disposed at both front and rear sides of the battery cell assembly; and at least one pressing plate provided between the pair of buffer plates and disposed between the battery cells of the battery cell assembly. The pair of buffer plates and the at least one pressing plate are configured such that front surfaces and rear surfaces thereof in a front and rear direction of the battery cell assembly have a flat shape.

14 Claims, 11 Drawing Sheets

(58) Field of Classification Search
CPC ............ H01M 50/244; H01M 50/202; H01M 50/262; H01M 50/271; H01M 50/289; H01M 50/293; H01M 10/0481; H01M 10/0486

See application file for complete search history.

(56) References Cited

U.S. PATENT DOCUMENTS

| | | | |
|---|---|---|---|
| 2016/0268573 | A1 | 9/2016 | Ishihara et al. |
| 2018/0183033 | A1 | 6/2018 | You |
| 2018/0254535 | A1 | 9/2018 | Kim et al. |
| 2020/0144576 | A1 | 5/2020 | Yoshida et al. |
| 2020/0161612 | A1 | 5/2020 | Lee et al. |
| 2020/0176745 | A1 | 6/2020 | Lee |
| 2021/0126317 | A1 | 4/2021 | Wang et al. |
| 2021/0143498 | A1 * | 5/2021 | Lee ..................... H01M 50/211 |

FOREIGN PATENT DOCUMENTS

| | | | |
|---|---|---|---|
| CN | 209249545 U | | 8/2019 |
| EP | 3125332 A1 * | 2/2017 | ......... B60L 11/1864 |
| JP | 2007-294407 A | | 11/2007 |
| JP | 2013-84444 A | | 5/2013 |
| JP | 2014-150039 A | | 8/2014 |
| JP | 5646726 B2 | | 12/2014 |
| JP | 5756530 B2 | | 7/2015 |
| JP | 2016-48622 A | | 4/2016 |
| JP | 2018-26244 A | | 2/2018 |
| JP | 2019-125456 A | | 7/2019 |
| KR | 10-2014-0136869 A | | 12/2014 |
| KR | 10-2016-0110167 A | | 9/2016 |
| KR | 10-2017-0013005 A | | 2/2017 |
| KR | 10-1714170 B1 | | 3/2017 |
| KR | 10-2017-0103701 A | | 9/2017 |
| KR | 10-2019-0054709 A | | 5/2019 |
| KR | 10-2019-0066731 A | | 6/2019 |
| KR | 10-2019-0074712 A | | 6/2019 |
| KR | 10-2019-0107398 A | | 9/2019 |
| WO | WO 2018/207608 A1 | | 11/2018 |

OTHER PUBLICATIONS

Extended European Search Report for corresponding European Application No. 21745025.3, dated Feb. 13, 2023.

* cited by examiner

BATTERY MODULE, BATTERY RACK COMPRISING SAME BATTERY MODULE, AND POWER STORAGE DEVICE

TECHNICAL FIELD

The present disclosure relates to a battery module, and a battery rack and an energy storage system including the battery module.

The present application claims priority to Korean Patent Application No. 10-2020-0008780 filed on Jan. 22, 2020 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack or a battery rack. Thus, the number of battery cells included in the battery pack or the battery rack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or a battery rack by using at least one battery module and adding other components.

The conventional battery module is generally configured to include at least one pressing plate between battery cells in order to minimize damage to the battery module when cell swelling occurs. The at least one conventional pressing plate is generally an EPP foam-type member and includes a plurality of protruding structures having an embossing shape.

However, in the conventional battery module, when cell swelling occurs at the battery cells, pressurization deviation may be generated among the battery cells due to uneven pressurization by the pressing plate including such an embossing-type structure.

If cell swelling occurs in the conventional battery module, the structural stability of the battery module is weakened due to pressurization deviation by the pressing plate, and battery lifespan performance is also deteriorated.

Therefore, there is a need to find a way for providing a battery module capable of minimizing pressurization deviation among battery cells, enhancing structural stability and increasing battery lifespan performance when cell swelling occurs, and a battery rack and an energy storage system including the battery module.

DISCLOSURE

Technical Problem

The present disclosure is directed to providing a battery module, which may minimize pressurization deviation among battery cells, and providing a battery rack and an energy storage system including the battery module.

In addition, the present disclosure is directed to providing a battery module, which may reinforce structural stability, and providing a battery rack and an energy storage system including the battery module.

Moreover, the present disclosure is directed to providing a battery module, which may improve battery lifespan performance, and providing a battery rack and an energy storage system including the battery module.

Technical Solution

In one aspect of the present disclosure, there is provided a battery module, comprising: a battery cell assembly having a plurality of battery cells stacked on each other; a pair of end plates provided at a front side and a rear side of the battery cell assembly, respectively; a pair of buffer plates respectively provided to the pair of end plates and disposed at the front side and the rear side of the battery cell assembly; and at least one pressing plate provided between one of the pair of buffer plates and disposed between the plurality of battery cells of the battery cell assembly, wherein the pair of buffer plates and the at least one pressing plate are configured such that front surfaces and rear surfaces thereof in a front and rear direction of the battery cell assembly have a flat shape.

The at least one pressing plate may be a plurality of pressing plates, and the plurality of pressing plates may be disposed between the plurality of battery cells, respectively, to make a surface contact with a facing battery cell of the plurality of battery cells.

At least one of the pair of buffer plates may be configured to make a surface contact with a facing battery cell of the plurality of battery cells.

The battery module may further comprise a support plate disposed between the battery cell assembly and one of the pair of buffer plates.

The support plate may be configured such that a front surface and a rear surface thereof in a front and rear direction of the battery cell assembly have a flat shape.

The support plate may be configured to make a surface contact with a facing battery cell of the plurality of battery cells.

The pair of buffer plates may be made of an insulating material.

The pair of buffer plates and the at least one pressing plate may be expanded polypropylene members.

In addition, the present disclosure further provides a battery rack, comprising: at least one battery module according to the above embodiments; and a rack case configured to accommodate the at least one battery module.

Moreover, the present disclosure further provides an energy storage system, comprising at least one battery rack according to the above embodiments.

Advantageous Effects

According to various embodiments as above, it is possible to provide a battery rack and an energy storage system including the battery module.

In addition, according to various embodiments as above, it is possible to provide a battery module, which may reinforce structural stability, and providing a battery rack and an energy storage system including the battery module.

Moreover, according to various embodiments as above, it is possible to provide a battery module, which may improve battery lifespan performance, and providing a battery rack and an energy storage system including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
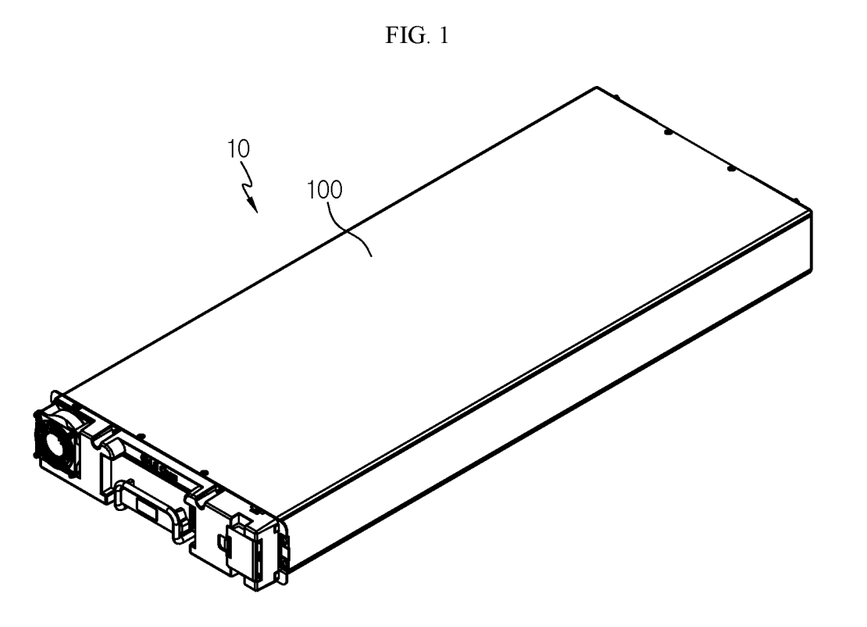
FIG. 1 is a diagram for illustrating a battery module according to an embodiment of the present disclosure.
Figure 2:
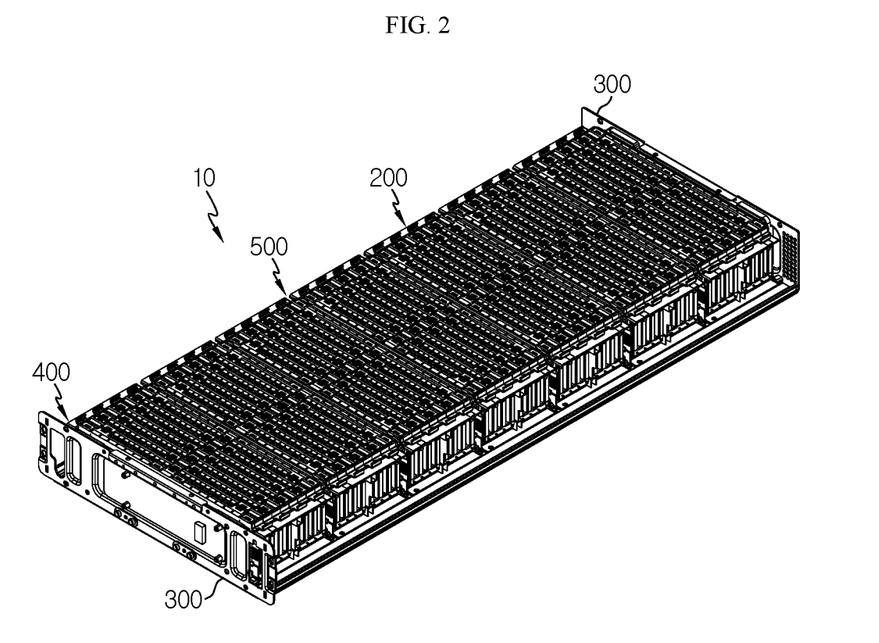
FIG. 2 is a perspective view showing the battery module of FIG. 1, from which a module case is excluded.
Figure 3:
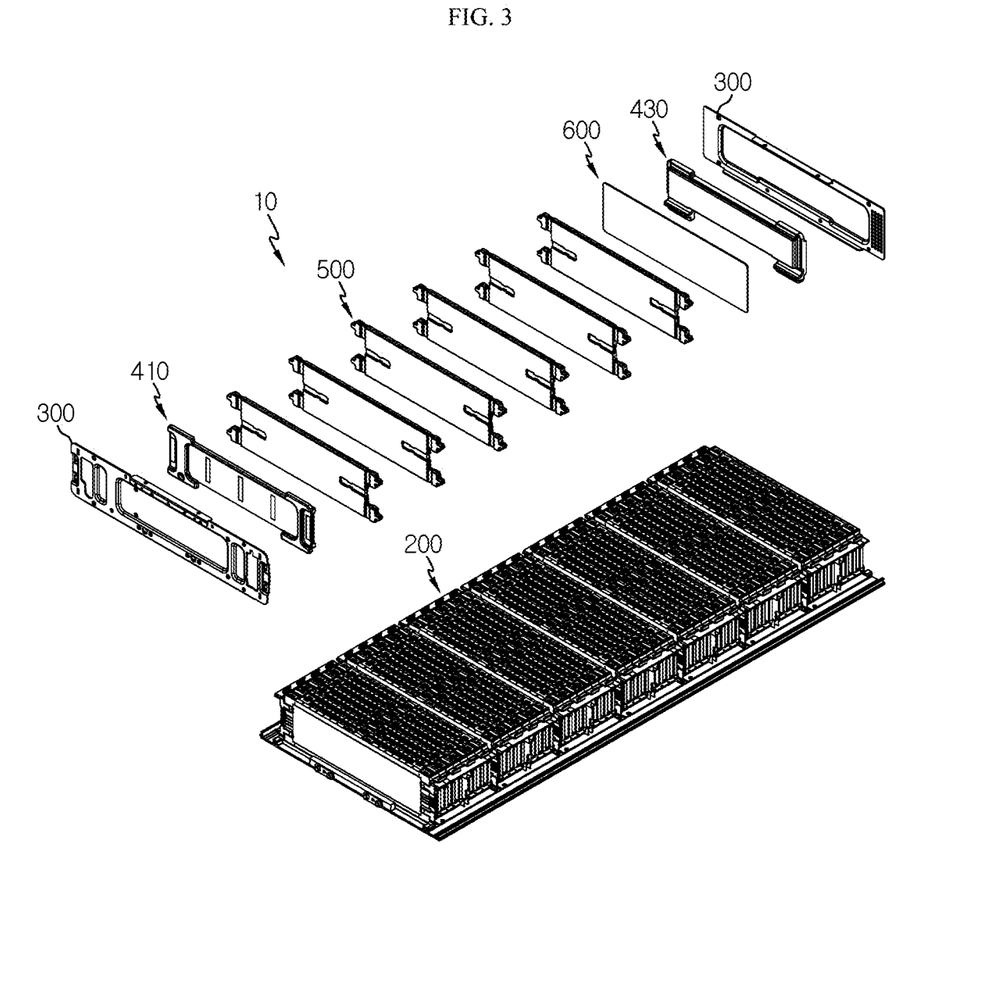
FIG. 3 is an exploded perspective view showing a main part of the battery module of FIG. 2.
Figure 4:
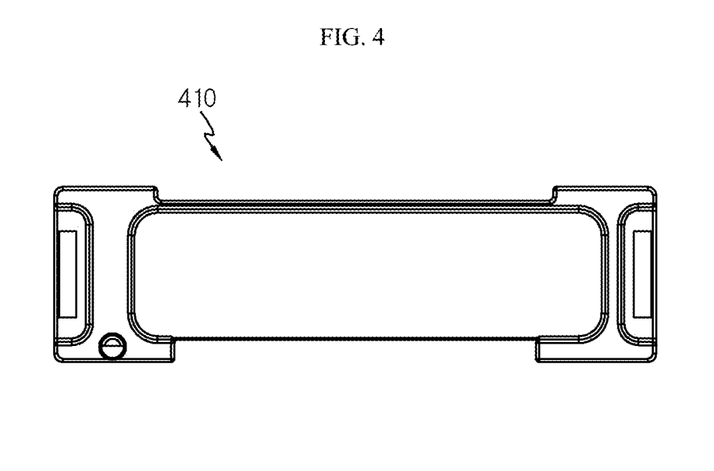
FIG. 4 is a diagram for illustrating a front buffer member of a buffer plate, employed at the battery module of FIG. 3.
Figure 5:
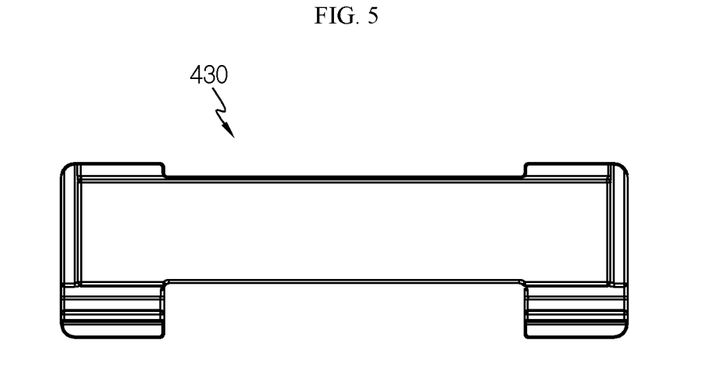
FIG. 5 is a diagram for illustrating a rear buffer member of the buffer plate, employed at the battery module of FIG. 3.
Figure 6:
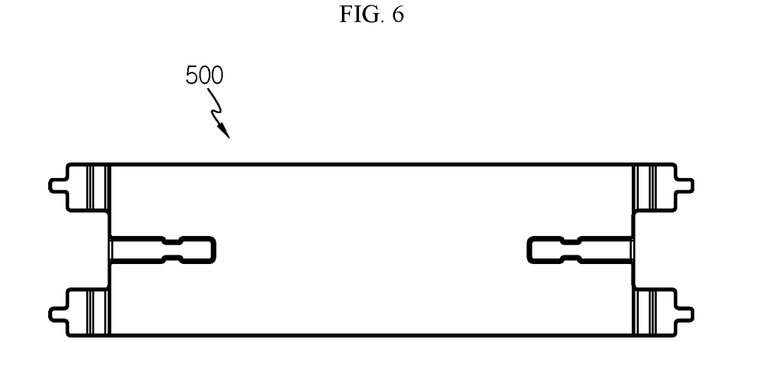
FIG. 6 is a diagram for illustrating a pressing plate, employed at the battery module of FIG. 3.
Figure 7:
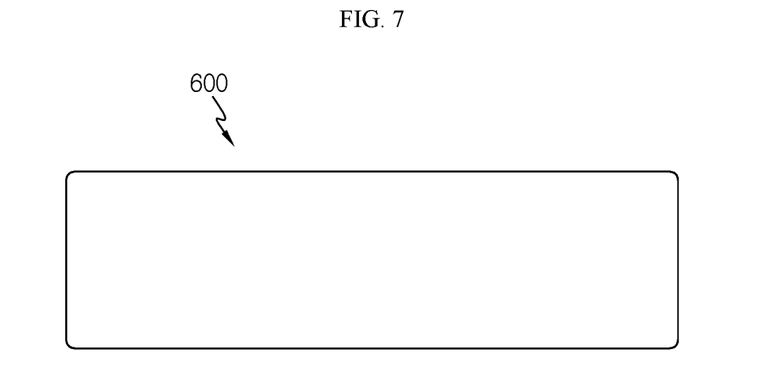
FIG. 7 is a diagram for illustrating a support plate, employed at the battery module of FIG. 3.

FIG. 1 is a diagram for illustrating a battery module according to an embodiment of the present disclosure, FIG. 2 is a perspective view showing the battery module of FIG. 1, from which a module case is excluded, FIG. 3 is an exploded perspective view showing a main part of the battery module of FIG. 2, FIG. 4 is a diagram for illustrating a front buffer member of a buffer plate, employed at the battery module of FIG. 3, FIG. 5 is a diagram for illustrating a rear buffer member of the buffer plate, employed at the battery module of FIG. 3, FIG. 6 is a diagram for illustrating a pressing plate, employed at the battery module of FIG. 3, and FIG. 7 is a diagram for illustrating a support plate, employed at the battery module of FIG. 3.

Referring to FIGS. 1 to 7, a battery module 10 may include a module case 100, a battery cell assembly 200, an end plate 300, a buffer plate 400, a pressing plate 500, and a support plate 600.

The module case 100 forms the appearance of the battery module 10, and may accommodate the module case 100, the battery cell assembly 200, the end plate 300, the buffer plate 400, the pressing plate 500 and the support plate 600, explained later.

The battery cell assembly 200 is accommodated in the module case 100 and may include a plurality of battery cells 210 stacked on each other. The battery cell assembly 200 may include the plurality of battery cells 210, a plurality of cell cartridges 230, and a base plate 250.

The plurality of battery cells 210 are secondary batteries and may be provided as a pouch-type secondary battery, a rectangular secondary battery or a cylindrical secondary battery. Hereinafter, in this embodiment, it will be described that the plurality of battery cells 210 are provided as pouch-type secondary batteries.

The plurality of cell cartridges 230 may support the plurality of battery cells 210. The plurality of cell cartridges 230 may support one or more battery cells 210 and may be stacked on each other along a stacking direction of the plurality of battery cells 210.

The base plate 250 may support the plurality of cell cartridges 230. To this end, the base plate 250 may have an area capable of supporting all of the plurality of cell cartridges 230.

The end plate 300 may be provided in a pair. The pair of end plates 300 may be provided at both front and rear sides of the battery cell assembly 200, respectively.

The buffer plate 400 may be provided in a pair. The pair of buffer plates 400 are provided to the pair of end plates 300 and may be disposed at both front and rear sides of the battery cell assembly 200.

The pair of buffer plates 400 may be formed such that considerable areas of front surfaces and rear surfaces thereof in the stacking direction of the battery cell assembly 200, namely a front and rear direction of the battery cell assembly 200, have a flat shape. Here, at least one of the pair of buffer plates 400 may make a surface contact with a facing battery cell 210 of the battery cell assembly 200.

The pair of buffer plates 400 may be made of an insulating material. The pair of buffer plates 400 may be provided as expanded polypropylene (EPP) members.

The pair of buffer plates 400 may include a front buffer member 410 and a rear buffer member 430.

The front buffer member 410 may be provided to a rear surface of the end plate 300 disposed at the front among the pair of end plates 300.

The rear buffer member 430 may be provided to a front surface of the end plate 300 disposed at the rear among the pair of end plates 300. Meanwhile, the rear buffer member 430 may include a cable passage 435 through which a cable member such as an electric cable or sensing cable for connecting electric components of the battery module 10 may pass.

The pressing plate 500 is provided between the pair of buffer plates 400 and may be disposed between the battery cells 210 of the battery cell assembly 200.

The pressing plate 500 may be formed such that considerable areas of a front surface and a rear surface thereof in the stacking direction of the battery cell assembly 200, namely in the front and rear direction of the battery cell assembly 200, have a flat shape.

Here, the pressing plate 500 may be disposed between the battery cells 210, respectively, to make a surface contact with a facing battery cell 210.

At least one pressing plate 500 or a plurality of pressing plates 500 may be provided. Hereinafter, in this embodiment, it will be described that the pressing plate 500 is provided in plural.

The plurality of pressing plates 500 may be made of an insulating material. The plurality of pressing plates 500 may be provided as expanded polypropylene (EPP) members.

The support plate 600 may be disposed between the battery cell assembly 200 and any one of the buffer plates 400. Specifically, the support plate 600 may be disposed between the battery cell assembly 200 and the rear buffer member 430 of the buffer plate 400.

The support plate 600 may be configured such that a front surface and a rear surface thereof in the front and rear direction of the battery cell assembly 200 have a flat shape. The support plate 600 may make a surface contact with a facing battery cell 210 of the battery cell assembly 200.

Hereinafter, when cell swelling occurs at the battery cells 210 of the battery cell assembly 200 of the battery module 10 according to this embodiment, a mechanism for eliminating pressurization deviation among the battery cells 210 will be described in more detail.

FIGS. 8 to 13 are diagrams for illustrating a mechanism for eliminating pressurization deviation among battery cells when cell swelling occurs at the battery cells of a battery cell assembly, employed at the battery module of FIG. 1.

Figure 8:
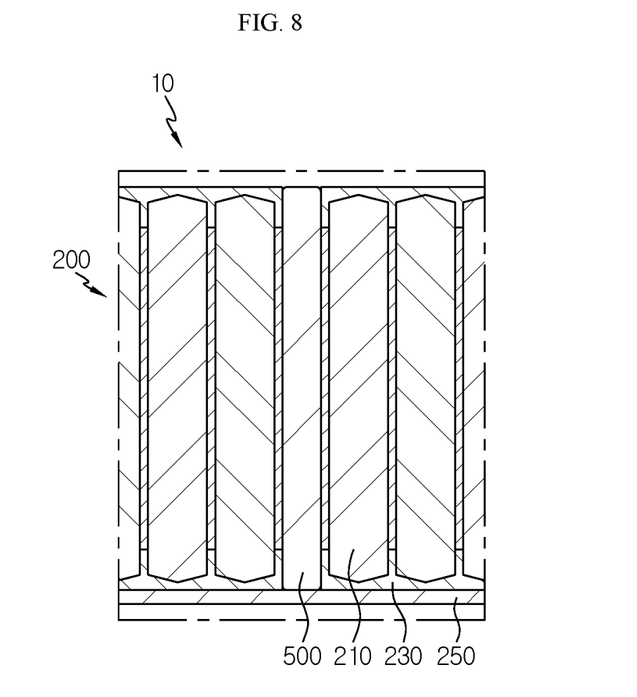
FIGS. 8 to 13 are diagrams for illustrating a mechanism for eliminating pressurization deviation among battery cells when cell swelling occurs at the battery cells of a battery cell assembly, employed at the battery module of FIG. 1.
Figure 9:
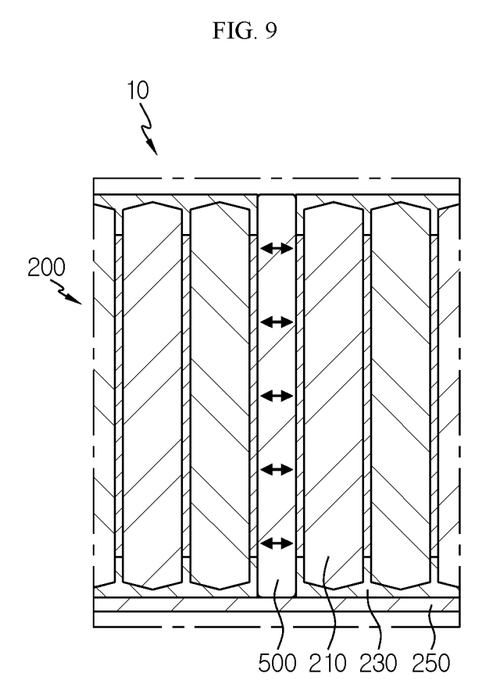

Referring to FIGS. 8 and 9, in the battery module 10, a cell swelling phenomenon may occur at the battery cells 210 of the battery cell assembly 200. According to the cell swelling phenomenon, cell expansion may occur in the front and rear direction of the battery cells 210, which is the stacking directions of the battery cells 210.

When cell swelling occurs, the plurality of pressing plates 500 according to this embodiment may uniformly press the facing front and rear surfaces of the battery cells 210 while making a surface contact with the facing battery cells 210.

Figure 10:
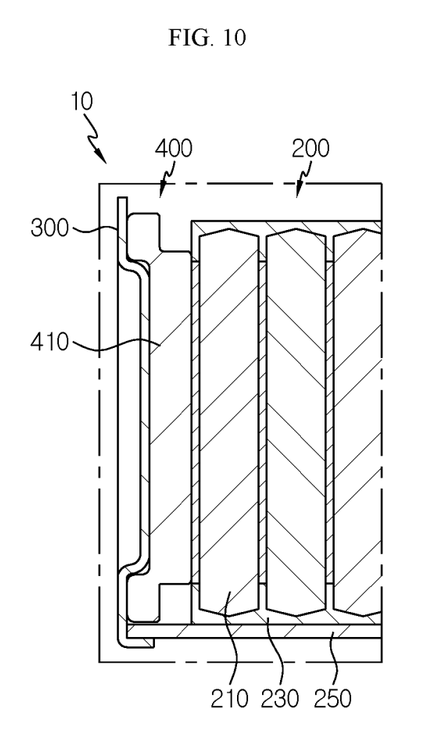
Figure 11:
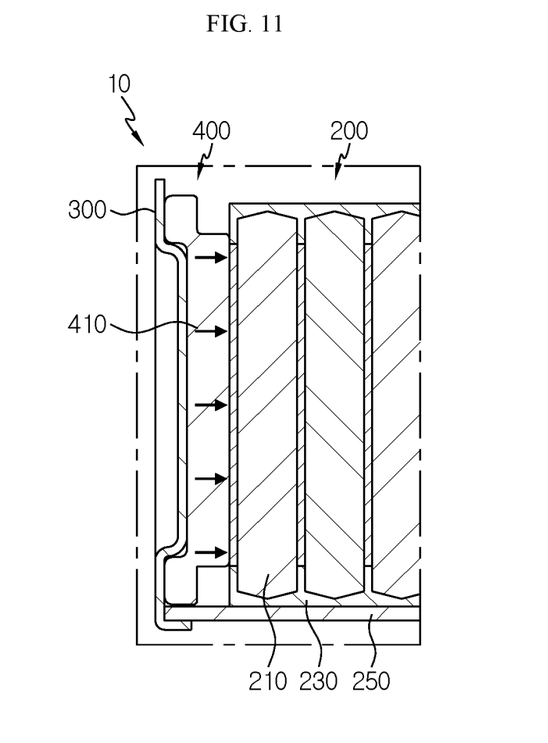

Referring to FIGS. 10 and 11, when the cell swelling occurs at the battery cells 210 of the battery cell assembly 200 of the battery module 10, the front buffer member 410 of the buffer plate 400 may also uniformly press the facing front surface of the battery cell 210 while making a surface contact with the facing battery cell 210.

Figure 12:
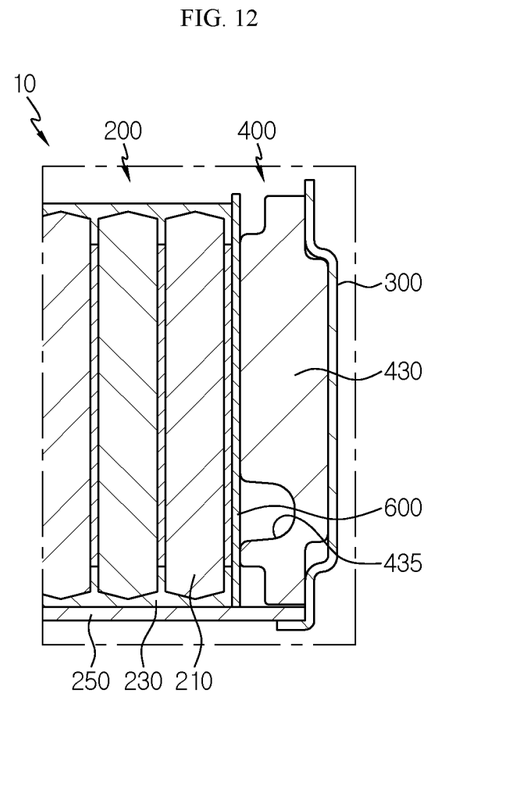
Figure 13:
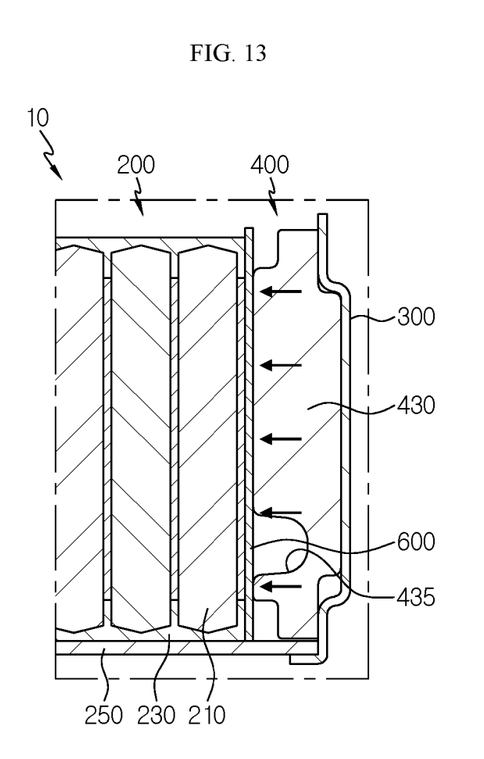

Referring to FIGS. 12 and 13, when cell swelling occurs at the battery cells 210 of the battery cell assembly 200 of the battery module 10, the rear buffer member 430 of the buffer plate 400 may uniformly press the facing rear surface of the battery cell 210 while making a surface contact with the facing battery cell 210, together with the support plate 600. In particular, the support plate 600 may supplement the surface contact pressing force near the cable passage 435 of the rear buffer member 430.

As described above, in this embodiment, since the battery cells 210 may be pressed more effectively by means of the buffer plate 400, the pressing plate 500 and the support plate 600 when cell swelling occurs at the battery cells 210, the pressurization deviation among the battery cells 210 may be effectively minimized.

In this embodiment, since the pressurization deviation among the battery cells 210 is eliminated, it is possible to further enhance the structural stability of the battery module 10 and further improve the lifespan performance of the battery module 10.

Figure 14:
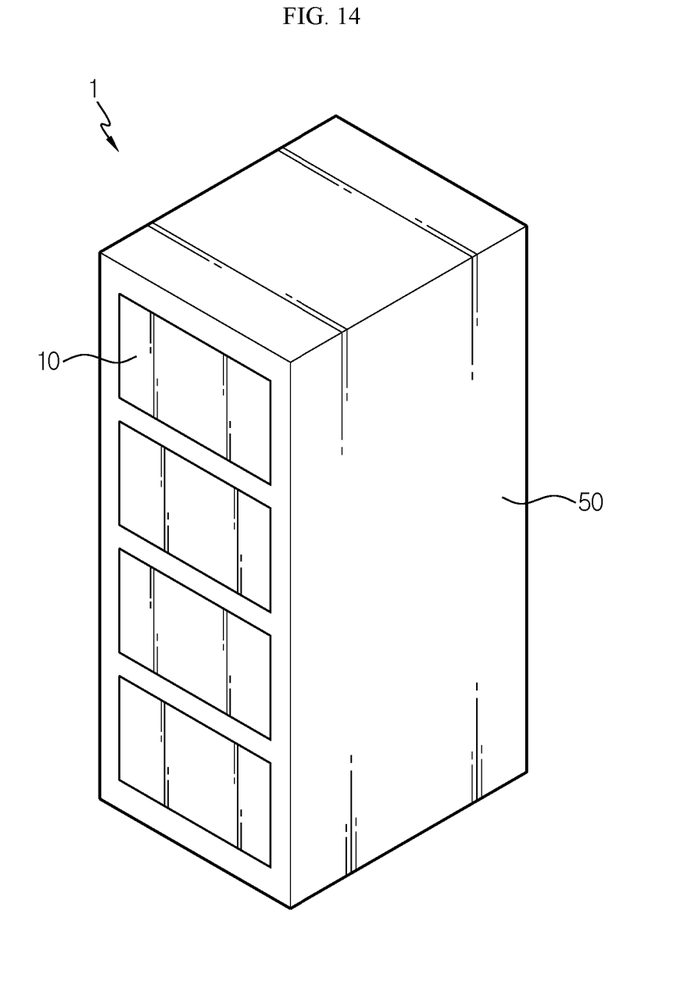
FIG. 14 is a diagram for illustrating a battery rack according to another embodiment of the present disclosure.

FIG. 14 is a diagram for illustrating a battery rack according to an embodiment of the present disclosure.

Referring to FIG. 9, a battery rack 1 may include the plurality of battery modules 10 of the former embodiment, and a rack case 50 for accommodating the plurality of battery modules 10.

Since the battery rack 1 of this embodiment includes the battery module 10 of the former embodiment, the battery rack 1 may have all advantages of the battery module 10 of the former embodiment.

Figure 15:
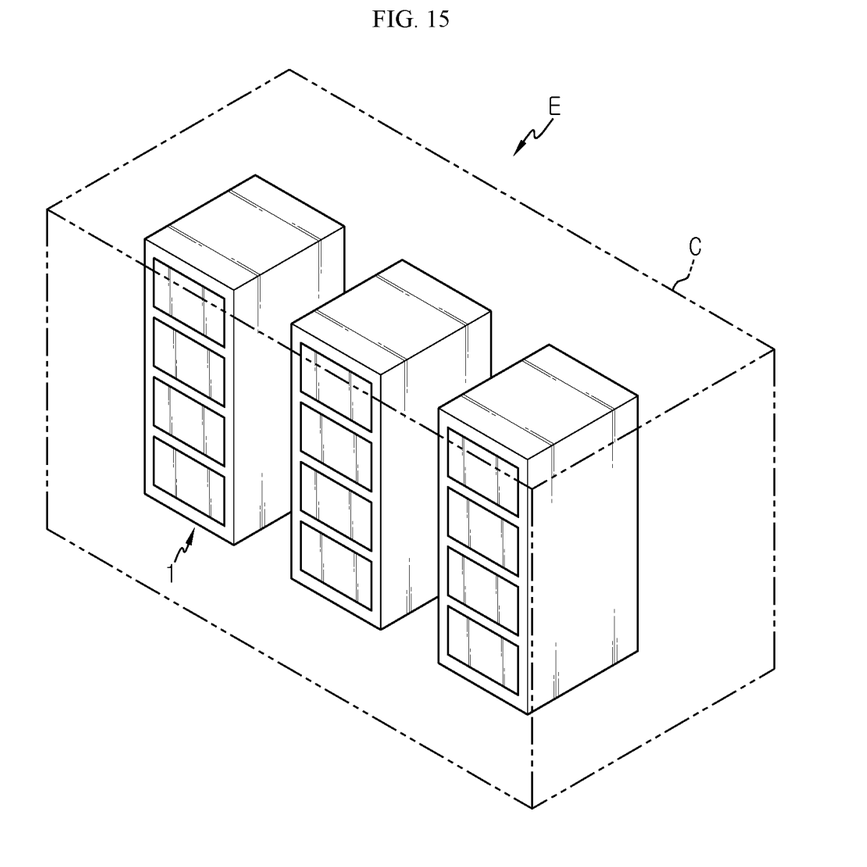
FIG. 15 is a diagram for illustrating an energy storage system according to an embodiment of the present disclosure.

FIG. 15 is a diagram for illustrating an energy storage system according to an embodiment of the present disclosure.

Referring to FIG. 15, an energy storage system E may be used for home or industries as an energy source. The energy storage system E may include at least one battery rack 1 of the former embodiment, or a plurality of battery racks 1 in this embodiment, and a rack container C for accommodating the plurality of battery racks 1.

Since the energy storage system E of this embodiment includes the battery rack 1 of the former embodiment, the energy storage system E may have all advantages of the battery rack 1 of the former embodiment.

According to various embodiments as above, it is possible to provide a battery module 10, which may improve manufacture efficiency, secure product reliability and control cell swelling, and to provide a battery rack 1 and an energy storage system E including the battery module 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:
1. A battery module, comprising:
 a battery cell assembly having a plurality of battery cells stacked on each other;
 a pair of end plates provided at a front side and a rear side of the battery cell assembly, respectively;
 a pair of buffer plates respectively provided to the pair of end plates and disposed at the front side and the rear side of the battery cell assembly; and
 at least one pressing plate provided between one of the pair of buffer plates and disposed between the plurality of battery cells of the battery cell assembly,
 wherein the pair of buffer plates and the at least one pressing plate are configured such that front surfaces and rear surfaces thereof in a front and rear direction of the battery cell assembly have a flat shape,
 wherein each of the pair of buffer plates has a first surface facing the respective end plate and a second surface facing the battery cell assembly, and
 wherein a cable passage for accommodating a cable member for connecting electric components of the battery module is formed in the second surface of a first buffer plate of the pair of buffer plates.

2. The battery module according to claim 1, wherein the at least one pressing plate is a plurality of pressing plates, and
 wherein the plurality of pressing plates are disposed between the plurality of battery cells, respectively, to make a surface contact with a facing battery cell of the plurality of battery cells.

3. The battery module according to claim 1, wherein at least one of the pair of buffer plates is configured to make a surface contact with a facing battery cell of the plurality of battery cells.

4. The battery module according to claim 1, further comprising:
 a support plate disposed between the battery cell assembly and the first buffer plate.

5. The battery module according to claim 4, wherein the support plate is configured such that a front surface and a rear surface thereof in a front and rear direction of the battery cell assembly have a flat shape.

6. The battery module according to claim 5, wherein the support plate is configured to make a surface contact with a facing battery cell of the plurality of battery cells.

7. The battery module according to claim 1, wherein the pair of buffer plates are made of an insulating material.

8. The battery module according to claim 1, wherein the pair of buffer plates and the at least one pressing plate are expanded polypropylene members.

9. The battery module according to claim 1, wherein the second surface of each of the pair of buffer plates has a central section contacting the respective pressing plate, and an upper section and lower section spaced from the respective pressing plate.

10. The battery module according to claim 9, wherein the cable passage is formed in the central section of the first buffer plate.

11. The battery module according to claim 1, wherein a thickness of the first buffer plate is greater than a thickness of a second buffer plate.

12. The battery module according to claim 4, wherein the support plate forms part of the cable passage.

13. A battery rack, comprising:
 at least one battery module as defined in claim 1; and
 a rack case configured to accommodate the at least one battery module.

14. An energy storage system, comprising:
 at least one battery rack as defined in claim 13.

* * * * *